United States Patent
Mangold et al.

(10) Patent No.: US 7,959,210 B2
(45) Date of Patent: Jun. 14, 2011

(54) FIXATION SYSTEM FOR A FOLDING TOP BIN COVER

(75) Inventors: Artur Mangold, Sulz (DE); Dirk Vogt, Stuttgart (DE); Rudolf Horch, Korb (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 12/942,141

(22) Filed: Nov. 9, 2010

(65) Prior Publication Data

US 2011/0109118 A1     May 12, 2011

(30) Foreign Application Priority Data

Nov. 11, 2009  (DE) .................. 10 2009 052 796

(51) Int. Cl.
*B60J 7/00*  (2006.01)
(52) U.S. Cl. .................. 296/136.06; 296/107.08
(58) Field of Classification Search ............. 296/136.06, 296/107.083
See application file for complete search history.

(56) References Cited

U.S. PATENT DOCUMENTS

| | | | |
|---|---|---|---|
| 6,053,559 A | 4/2000 | Haberl et al. | |
| 6,318,792 B1 * | 11/2001 | Neubrand et al. | 296/107.08 |
| 6,520,561 B1 * | 2/2003 | Miklosi et al. | 296/136.06 |
| 6,866,327 B2 | 3/2005 | Willard | |

FOREIGN PATENT DOCUMENTS

DE      102004038433 A1    2/2006

* cited by examiner

*Primary Examiner* — Joseph D Pape
(74) *Attorney, Agent, or Firm* — Brooks Kushman P.C.

(57) ABSTRACT

A folding top bin cover assembly includes a folding top bin cover and a fixation system. The bin cover is movable to a covered position in which the bin cover covers a folding top bin of a vehicle body. The fixation system acts between the bin cover and a structural element fixable to the vehicle body. The fixation system has a fixing mechanism including a sliding element and an insertion bracket. The sliding element is connected to the bin cover and the insertion bracket is fixedly connected to the structural element. The fixation system adjusts the bin cover at right angles to the longitudinal direction of the vehicle body as the sliding element operates interactively with the insertion bracket while the bin cover is in the covered position.

20 Claims, 7 Drawing Sheets

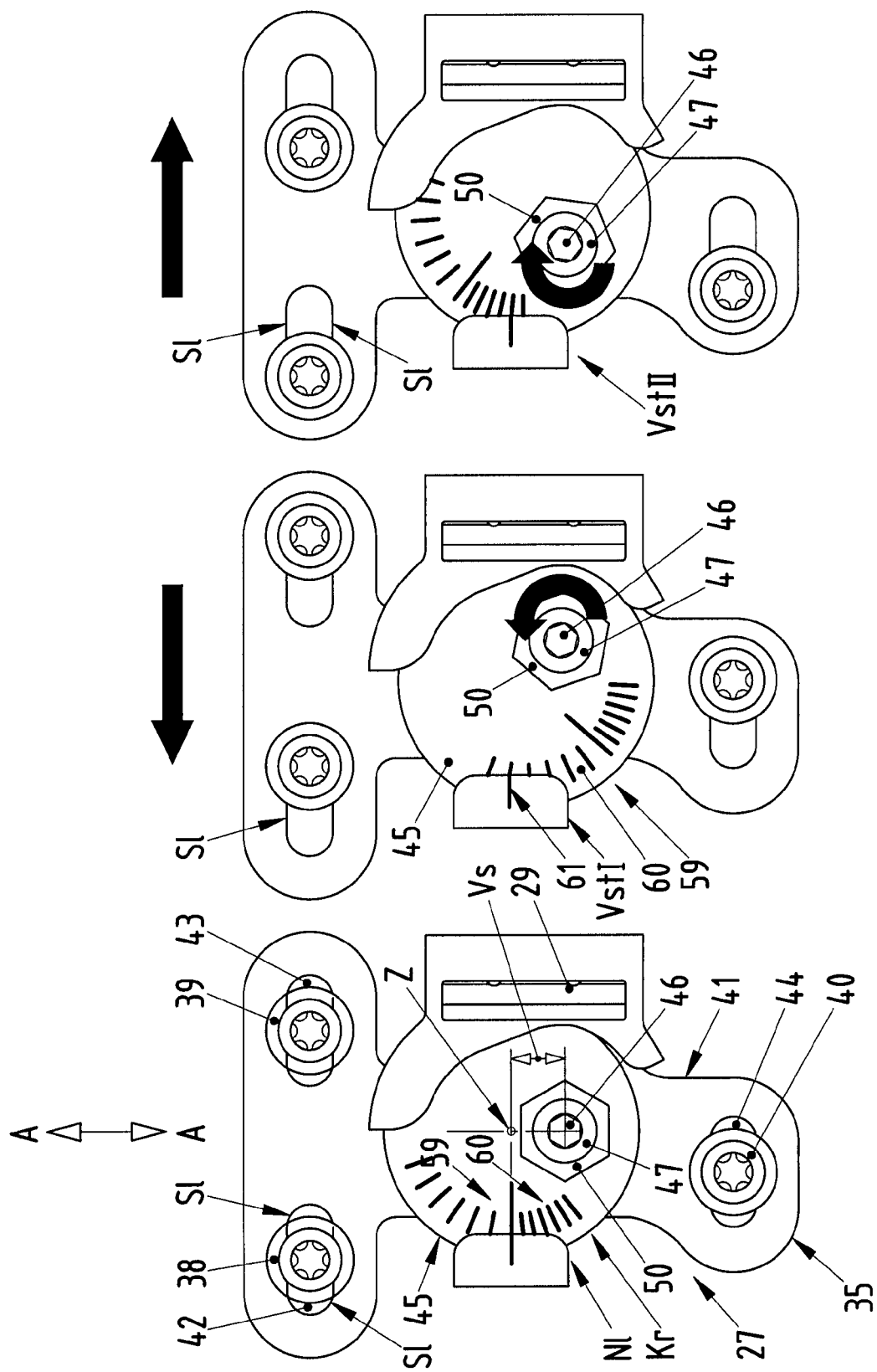

FIXATION SYSTEM FOR A FOLDING TOP BIN COVER

CROSS-REFERENCE TO RELATED APPLICATIONS

This application claims foreign priority benefits under 35 U.S.C. §119(a)-(d) to DE 10 2009 052 796.6, filed on Nov. 11, 2009, which is hereby incorporated by reference in its entirety.

BACKGROUND OF THE INVENTION

1. Field of the Invention

The present invention relates to a fixation system for a folding top bin cover of a passenger vehicle equipped with folding top bin and a collapsible roof.

2. Background Art

DE 198 00 156 A1 (corresponding to U.S. Pat. No. 6,053,559) describes a vehicle having a collapsible roof movable between closed and opened positions. The vehicle includes a folding top bin and an associated folding top bin cover. The bin cover is movable between a covered position in which the bin cover covers the bin and an uncovered position in which the bin cover uncovers the bin. When the roof is in its opened position stored within the bin, the bin cover is typically in its covered position covering the bin. A lever mechanism such as a four-bar linkage is operable to move the bin cover between its covered and uncovered positions. Each of the two longitudinal sides of the lever mechanism includes a front lever and a rear lever. Each rear lever is hinged at the bin cover and on the vehicle.

U.S. Pat. No. 6,866,327 describes a vehicle having a collapsible roof, a folding top bin, and a folding top bin cover. The bin cover is movable by a support arm system into a first position in which the bin cover uncovers the bin such that the roof may be lowered into the bin and into a second position for enabling the loading of baggage into the bin. A fixation system is located in a front region of the bin cover relative to the forward motion of the vehicle. The fixation system has a guide track on the vehicle body and a guide pin that cooperates with the guide track.

DE 10 2004 038 433 describes a vehicle having a folding top, a folding top bin, and a folding top bin cover. A hold-down device attached to the bin cover includes an introduction channel and a supporting channel. The channels cooperate with a centering pin of the folding top.

SUMMARY OF THE INVENTION

An object of the present invention includes a fixation system operable to adjust a folding top bin cover for a folding top bin of a passenger vehicle at right angles to the longitudinal direction of the vehicle in which the fixation system is characterized by having proper functionality and ease of implementation and enabling adjustment of fabrication tolerances by conventional means.

In carrying out the above object and other objects, the present invention provides a folding top bin cover assembly. The assembly includes a folding top bin cover and a fixation system. The bin cover is movable to a covered position in which the folding top bin cover covers a folding top bin of a vehicle body. The fixation system acts between the folding top bin cover and structural elements fixable to the vehicle body. The fixation system has a first fixing mechanism including a sliding element and an insertion bracket. The sliding element is connected to the folding top bin cover and the insertion bracket is fixedly connected to a first one of the structural elements. The fixation system adjusts the folding top bin cover at right angles to the longitudinal direction of the vehicle body as the sliding element operates interactively with the insertion bracket while the folding top bin cover is in the covered position.

Embodiments of the present invention provide a fixation system operable to systematically align a folding top bin cover relative to a folding top bin in the body of a vehicle such that the bin cover assumes an appropriate structurally predetermined attitude when the bin cover is in its covered position. In particular, the fixation system adjusts the folding top bin cover at right angles to the longitudinal direction of the vehicle. The fixation system includes a pair of fixing mechanisms. Each fixing mechanism includes a sliding element and an insertion bracket which can be both achieved with minimal effort. Each insertion bracket is provided in a simple manner on a corresponding high-strength structural element of the vehicle body. Each structural element can be formed as a metal casting. In an embodiment, each insertion bracket is fabricated with the corresponding structural element from a single piece. The sliding element of each fixing mechanism may be integrated with a corresponding retaining device arranged on an inner wall of the bin cover.

In order to take manufacturing considerations into consideration, provisions are made on each fixing mechanism by which the sliding element and a bearing plate of the retaining device are adjustable for offsetting the tolerances at right angles to the longitudinal direction of the vehicle. Slotted openings are provided in the bearing plate for screws and an eccentric disk. This can be accomplished with relatively minimal effort. The required adjustment procedures for the sliding element can be carried out especially well by the eccentric disk. In an embodiment, the sliding element is surrounded by a covering cap which enables a low-noise operation of the sliding element with the insertion bracket.

The above features, and other features and advantages of the present invention are readily apparent from the following detailed descriptions thereof when taken in connection with the accompanying drawings.

BRIEF DESCRIPTION OF THE DRAWINGS

FIG. 7 illustrates a view looking towards the fixing mechanism with an eccentric disk in a zero position;

FIG. 8 illustrates a view corresponding to FIG. 7 with the eccentric disk in a first adjustment position; and FIG. 9 illustrates a view corresponding to FIG. 7 with the eccentric disk is in a second adjustment position.

DETAILED DESCRIPTION OF THE PREFERRED EMBODIMENT(S)

Figure 1:
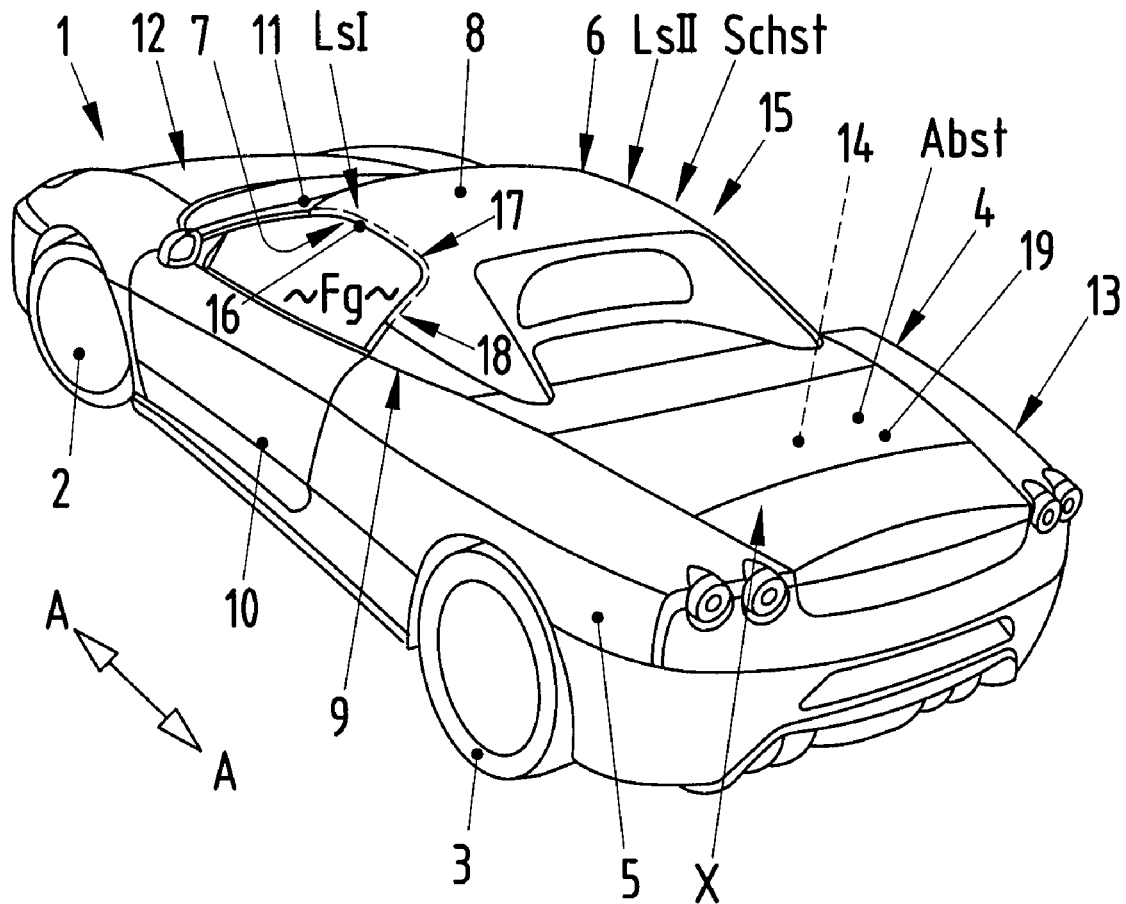
FIG. 1 illustrates a perspective view of a passenger vehicle having a collapsible roof, a folding top bin, a folding top bin cover, and a fixation system for adjusting the alignment of the folding top bin cover in accordance with an embodiment of the present invention.

Referring now to FIG. 1, a perspective view of a passenger vehicle 1 in accordance with an embodiment of the present invention is shown. Vehicle 1 includes a vehicle body 4 supported by two sets of wheels 2 and 3. The rear end of vehicle body 4 includes a folding top bin body 5 which forms a folding top bin 14 within the vehicle body. Bin 14 is akin to a trunk or a storage compartment.

Vehicle body 4 further includes a folding top bin cover 19. Bin cover 19 is pivotably supported on respective longitudinal sides of vehicle body 4 to move between a lowered covered position Abst and a raised uncovered position (not shown). In the covered position, bin cover 19 covers (i.e., closes) bin 14 with respect to the vehicle body top side and thereby prevents access to bin 14. In the uncovered position, bin cover 19 uncovers (i.e., opens) bin 14 and thereby enables access to bin 14.

Vehicle 1 further includes a collapsible roof (i.e., a folding top) 6 with top rails 7, a cloth top 8, and interior upholstery (not shown). Roof 6 is movable between a closed position Schst and an opened position. In its closed position, roof 6 extends over and covers a passenger space Fg of vehicle body 4. In its opened position, roof 6 is collapsed or folded and is lowered into bin 14 for storage therein. Roof 6 and bin body 5 meet near a belt line 9 that contains doors 10, a windshield frame 11, a nose 12, and a rear end 13. In roof region 15 of roof 6, top rail 7 with a support arm system 16 oriented in the longitudinal vehicle direction A-A is provided. Support arm system 16 includes a front and rear roof support arms 17, 18 that face one another on longitudinal vehicle body sides LsI and LsII. Roof support arms 17, 18 are movable with respect to one another to enable roof 6 to move between its closed and opened positions.

In order for roof 6 to be able to move between its closed and opened positions, bin cover 19 has to be in its raised uncovered position. That is, bin cover 19 has to be in its uncovered position when roof 6 is being moved from its closed position to its opened position. Likewise, bin cover 19 has to be in its uncovered position when roof 6 is being moved from its opened position to its closed position. As such, when bin cover 19 is in its covered position and roof 6 is to be moved into or out of bin 14, bin cover 19 has to be moved to its uncovered position. During typical operation, bin cover 19 is in its covered position when roof 6 is set in either of its closed or opened positions. When roof 6 is in its opened position and stored within bin 14 and when bin cover 19 is in its covered position, bin cover 19 covers bin 14 and roof 6 stored therein.

Figure 2:
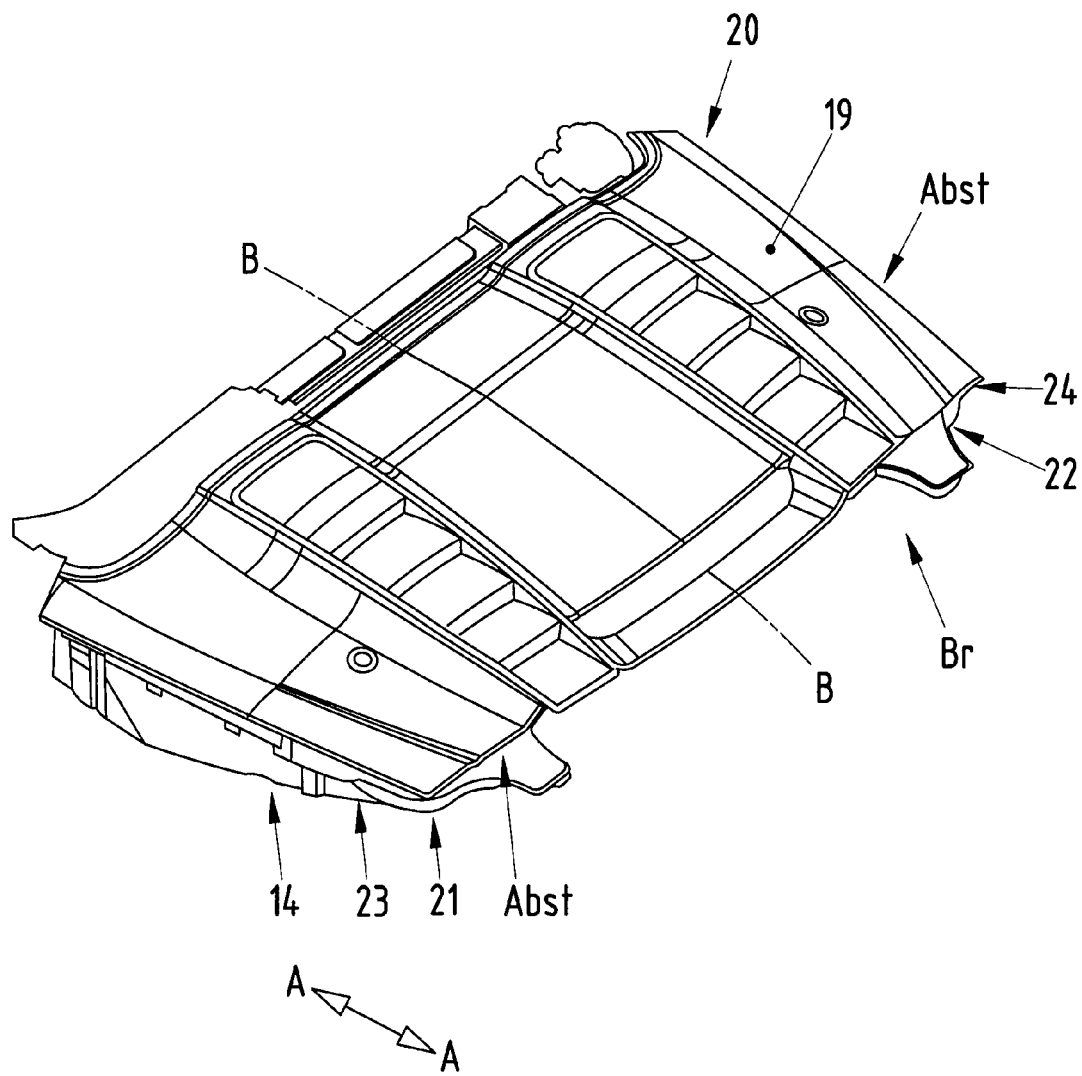
FIG. 2 illustrates an enlarged view of the detail X of FIG. 1.
Figure 3:
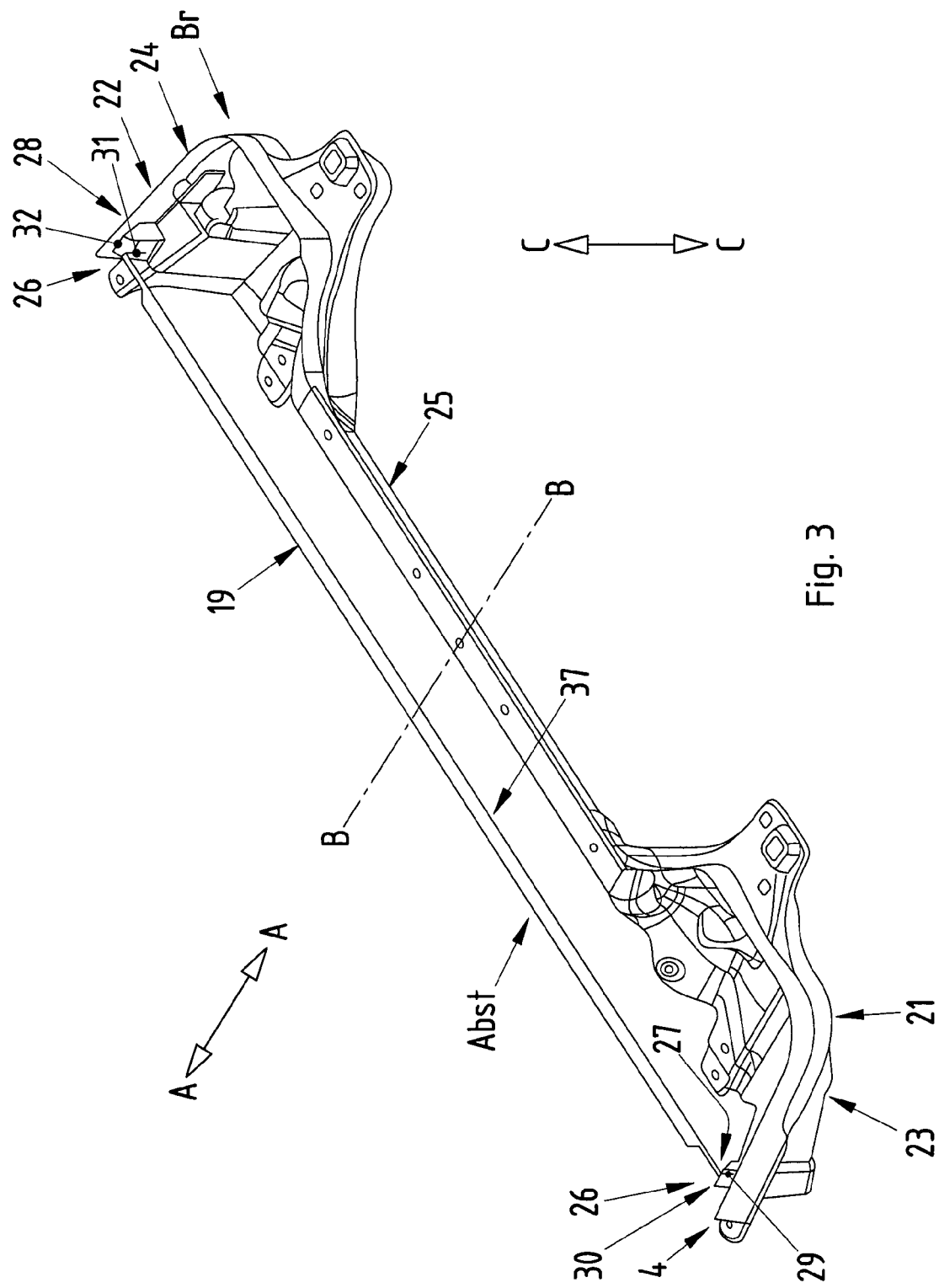
FIG. 3 illustrates a partial view of the rear region of the detail X of FIG. 1 as illustrated in FIG. 2 with the fixation system being schematically indicated.

Referring now to FIGS. 2 and 3, with continual reference to FIG. 1, in this embodiment, bin 14, bin cover 19 with a hinge system (not shown), and roof 6 form a modular structural unit 20, which is preassembled outside vehicle 1 and inserted in the assembled state into vehicle body 4 and then joined to the vehicle body.

High-strength corner elements 21, 22 of bin 14 are located in a rear facing region Br of bin 14 on both sides of a longitudinal vehicle middle plane B-B. Corner elements 21, 22 are respectively attached to structural elements 23, 24 which are rigidly connected to bin body 5 of vehicle body 4. Structural elements 23, 24 are fabricated as a type of casting, for example, of light metal. A cross-beam 25 supports structural elements 23, 24 and absorbs pressure, tension, and torsional forces.

Vehicle 1 further includes a fixation system 26 for adjusting the alignment of bin cover 19. Fixation system 26 aligns bin cover 19 when bin cover 19 is in the lowered covered position Abst. Fixation system 26 sets bin cover 19 at right angles to the longitudinal vehicle direction A-A. For providing its functions, fixation system 26 includes first and second fixing mechanisms 27, 28. Fixing mechanisms 27, 28 are located on respective sides of the longitudinal vehicle middle plane B-B. Fixing mechanisms 27, 28 act between bin cover 19 and respective ones of structural elements 23, 24.

Each fixing mechanism includes a sliding element and an insertion bracket that are held in position on the neighboring structural element. In particular, first fixing mechanism 27 includes a sliding element 29 and an insertion bracket 30 that are hold in position on the neighboring structural element 23. Similarly, second fixing mechanism 28 includes a sliding element 31 and an insertion bracket 32 that are held in position on the neighboring structural element 24.

Figure 4:
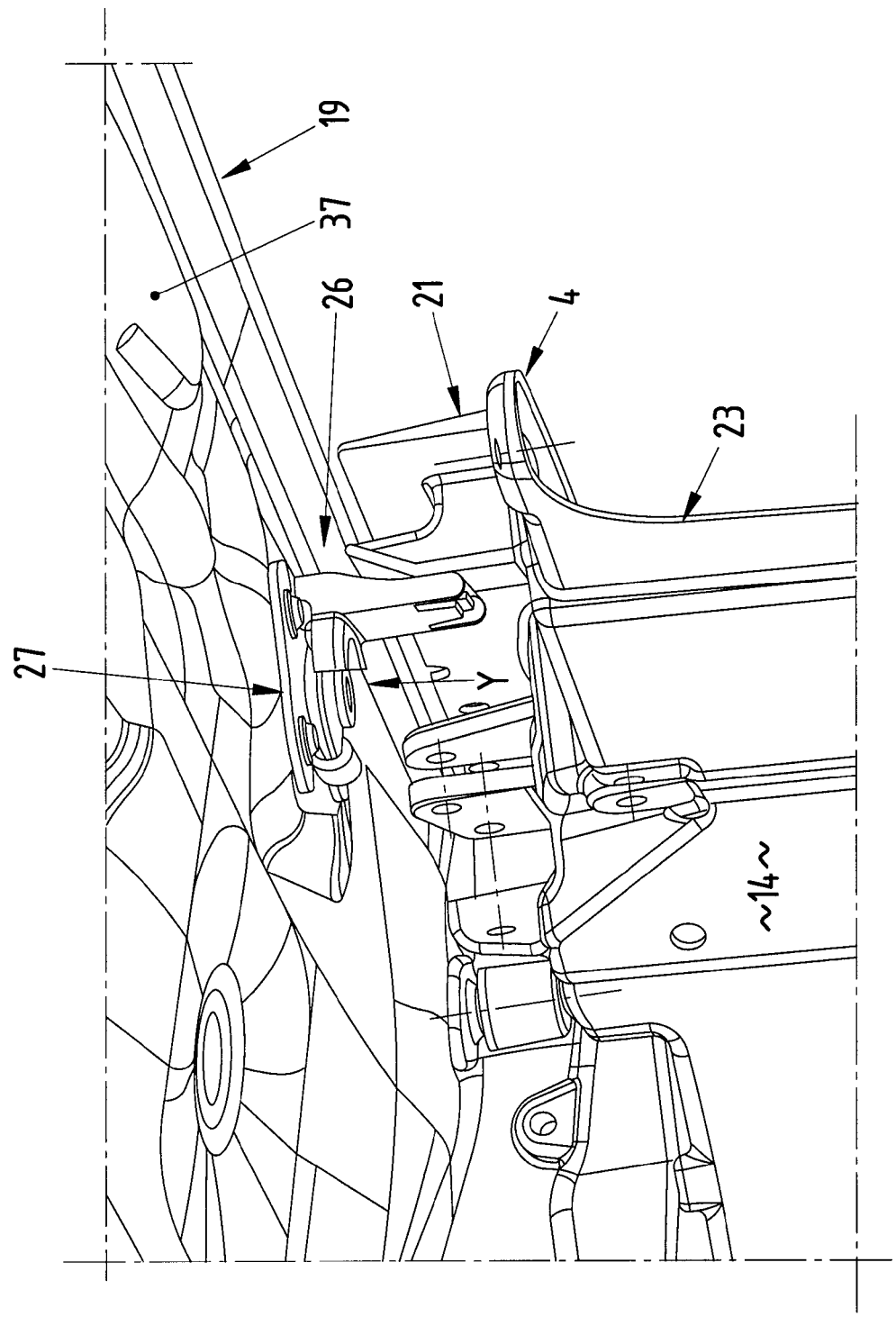
FIG. 4 illustrates an oblique view onto one of the fixing mechanisms of the fixation system.
Figure 5:
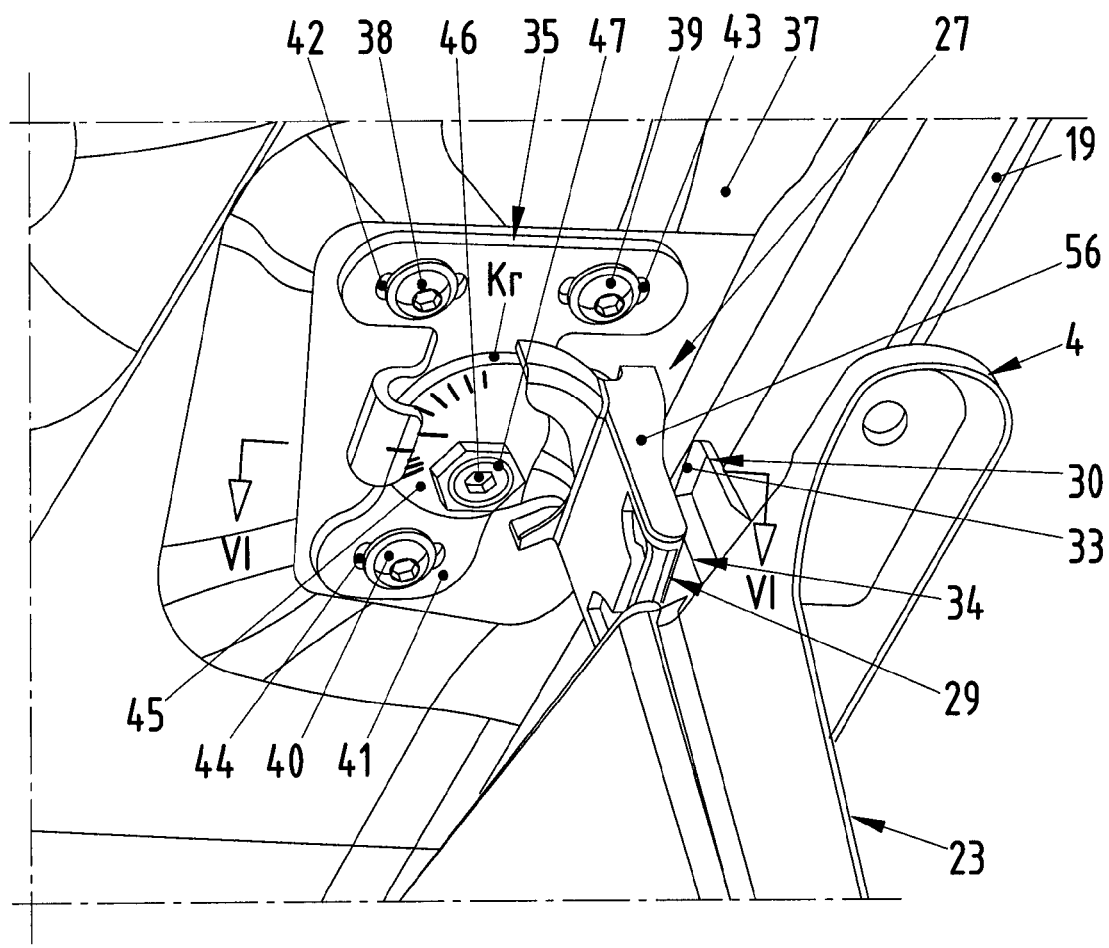
FIG. 5 illustrates an enlarged view of the detail Y of FIG. 4.
Figure 6:
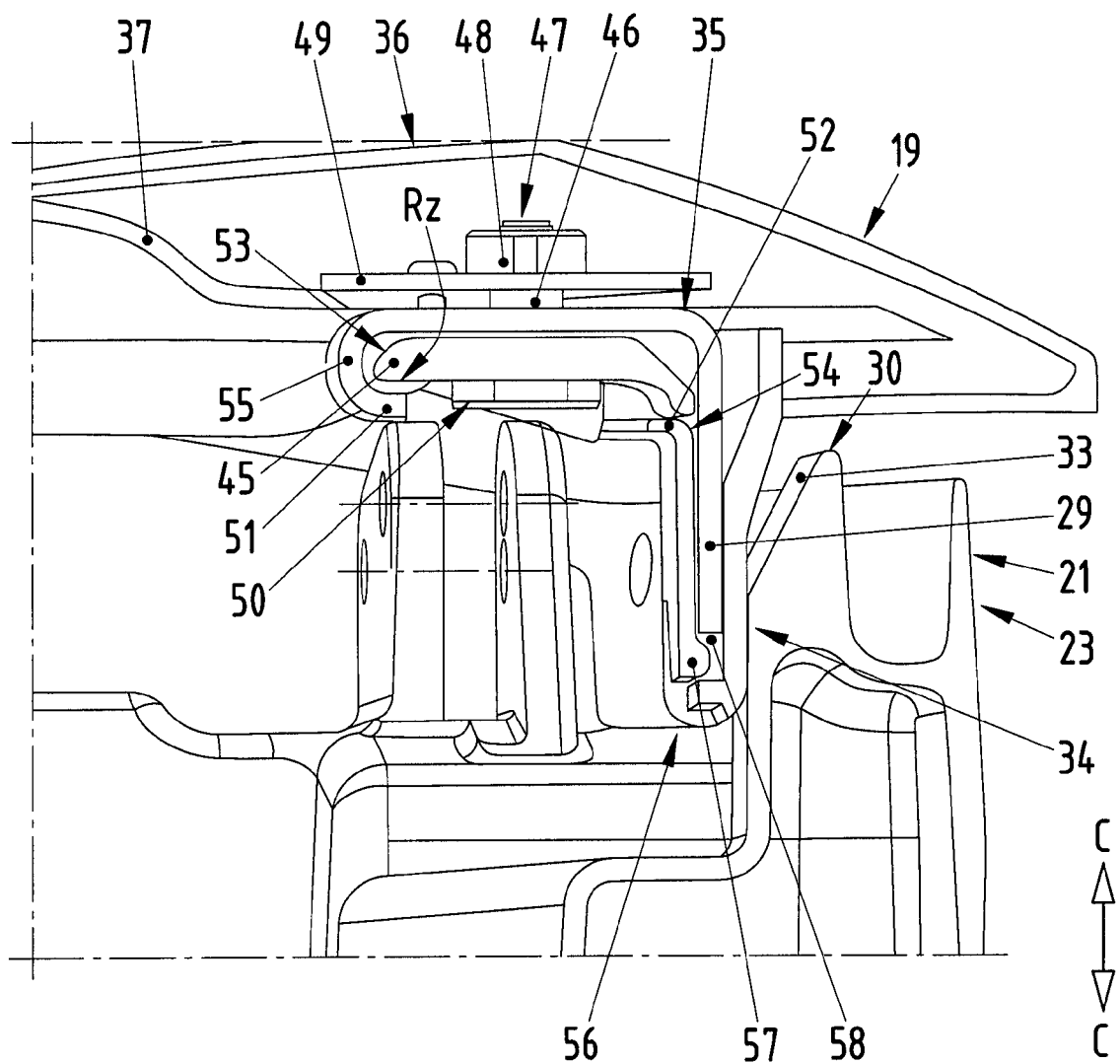
FIG. 6 illustrates an enlarged sectional view along line VI-VI of FIG. 5.

Referring now to FIGS. 4 through 9, with continual reference to FIGS. 1, 2, and 3, first fixing mechanism 27 will be described in greater detail. As fixing mechanisms 27, 28 generally include the same configuration and function, only first fixing mechanism 27 will be described in greater detail. FIG. 4 illustrates an oblique view onto fixing mechanism 27; FIG. 5 illustrates an enlarged view of the detail Y of FIG. 4; FIG. 6 illustrates an enlarged sectional view along line VI-VI of FIG. 5; and FIGS. 7, 8, and 9 illustrates views looking towards first fixing mechanism 27 with an eccentric disk 45 associated therewith in a zero position, a first adjustment position, and a second adjustment position, respectively.

As indicated above, first fixing mechanism 27 includes a sliding element 29 and an insertion bracket 30. Sliding element 29 and insertion bracket 30 are held in position on the neighboring structural element 23. Structural element 23 is fixedly connected to vehicle body 4 and is attached to high-strength corner element 21 of bin 14.

Insertion bracket 30 is fabricated from one piece with either corner element 21 or structural element 23. Viewed in the vertical direction C-C of vehicle 1, insertion bracket 30 has an upper oblique introduction channel 33 and a lower perpendicular supporting channel 34.

Sliding element 29 is structurally integrated with a retaining device 35. Retaining device 35 is arranged on an inner wall structure 37 lying in a frame-like manner inside an outer wall 36 of bin cover 19. Retaining device 35 includes a bearing plate 41. Bearing plate 41 is connected to inner wall structure 37 by screws 38, 39, and 40. Bearing plate 41 has slotted openings 42, 43, and 44 whose longer sides SI are aligned at right angles to the longitudinal vehicle axis A-A. Bearing plate 41 can be fabricated from a single piece with sliding element 29.

An eccentric disk 45 is on bearing plate 41 through which sliding element 29 and bearing plate 41 can be adjusted at right angles to the longitudinal vehicle axis A-A. Disk 45 is limited by a circle Kr. A set screw 46 of disk 45 is located with an offset Vs with respect to a center Z or circle Kr. Set screw 46 is a screw such as an allen screw 47 whose threaded bolt 48 penetrates bearing plate 41 and rests with a thread in a supporting console 49 (see FIG. 6) of inner wall structure 37. Activation of disk 45 is provided by a nut-shaped hexagonal element 50. Hexagonal element 50 is fabricated from a single piece with disk 45.

Disk 45 is limited in the axial direction of set screw 46 or center Z by first and second supporting arms 51, 52 (see FIG. 6). Supporting arms 51, 52 are located on opposite sides 53, 54 of the circumference of circle Kr. First supporting arm 51 is formed on a U-shaped bearing plate section 55. Plate section 55 surrounds an edge zone Rz of disk 45. Second supporting arm 52 is part of a noise attenuating liner cap 56. Liner cap 56 may be made of plastic.

Liner cap 56 surrounds rod-like sliding element 29 and cooperates with introduction channel 33 and supporting channel 34 of insertion bracket 30. An elastic manual override element 57 is integrated in liner cap 56. Override element 57 is pressed into a recess 58 of sliding element 29 such that liner cap 56 is held on to sliding element 29.

As shown in FIGS. 7, 8, and 9, a vernier 59 is provided on the visible side of disk 45. First supporting arm 51 encloses a scale on disk 45. A positioning bar 61 is on first supporting arm 51. In FIG. 7, disc 45 is in a zero position Ni for bearing plate 41 and sliding element 29. In FIG. 8, disc 45 is in a first adjustment position VstI for bearing plate 41 and sliding element 29. In FIG. 9, disc 45 is in a second adjustment position VstII for bearing plate 41 and sliding element 29.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A folding top bin cover assembly comprising:
   a folding top bin cover movable to a covered position in which the folding top bin cover covers a folding top bin of a vehicle body;
   a fixation system acting between the folding top bin cover and structural elements fixable to the vehicle body;
   the fixation system having a first fixing mechanism including a sliding element and an insertion bracket, wherein the sliding element is connected to the folding top bin cover and the insertion bracket is fixedly connected to a first one of the structural elements;
   wherein the fixation system adjusts the folding top bin cover at right angles to the longitudinal direction of the vehicle body as the sliding element operates interactively with the insertion bracket while the folding top bin cover is in the covered position.

2. The assembly of claim 1 wherein:
   the fixation system adjusts the folding top bin cover for the folding top bin cover to assume an appropriate structurally predetermined attitude while the folding top bin cover is in the covered position.

3. The assembly of claim 1 wherein:
   the fixation system further includes a second fixing mechanism including a second sliding element and a second insertion bracket, wherein the second sliding element is connected to the folding top bin cover and the second insertion bracket is fixedly connected to a second one of the structural elements;
   wherein the first and second fixing mechanisms are respective sides of a longitudinal center plane of the vehicle body.

4. The assembly of claim 1 wherein:
   the insertion bracket includes an upper oblique introduction channel and a lower perpendicular supporting channel.

5. The assembly of claim 1 wherein:
   the insertion bracket and the first one of the structural elements fixable to the vehicle body are a unitary unit.

6. The assembly of claim 1 further comprising:
   a retaining device on an inner wall of the folding top bin cover, wherein the sliding element is incorporated with the retaining device.

7. The assembly of claim 6 wherein:
   the retaining device has a bearing plate connected to the inner wall of the folding top bin cover.

8. The assembly of claim 7 wherein:
   the bearing plate is connected to the inner wall of the folding top bin cover by a plurality of screws.

9. The assembly of claim 8 wherein:
   the bearing plate includes a plurality of slotted openings proceeding at right angles to the longitudinal direction of the vehicle body;
   wherein the screws respectively penetrate the slotted openings in order to connect the bearing plate to the inner wall of the folding top bin cover.

10. The assembly of claim 9 further comprising:
    a rotatable eccentric disk attached to the bearing plate, wherein the sliding element and the bearing plate are adjustable through the eccentric disk at right angles to the longitudinal direction of the vehicle body.

11. The assembly of claim 10 wherein:
    the eccentric disk is bounded by a circle and includes a set screw, wherein the set screw of the eccentric disk is offset with respect to a center of the circle.

12. The assembly of claim 11 wherein:
    the set screw has a threaded bolt that penetrates the bearing plate and rests with a thread in a supporting console of the inner wall of the folding top bin cover.

13. The assembly of claim 10 wherein:
    the eccentric disk further includes a nut-shaped hexagonal adjustment element, wherein the hexagonal adjustment element surrounds the set screw.

14. The assembly of claim 10 wherein:
    the eccentric disk is limited in the axial direction of the set screw by a first supporting arm and a second supporting arm which are located on the opposite sides of the eccentric disk.

15. The assembly of claim 14 wherein:
    the first supporting arm is on a U-shaped section of the bearing plate that surrounds an edge zone of the eccentric disk.

16. The assembly of claim 14 wherein:
    the insertion bracket includes an upper oblique introduction channel and a lower perpendicular supporting channel;
    wherein the second supporting arm is part of a liner cap which at least partially surrounds the sliding element and cooperates with the introduction channel and the supporting channel of the insertion bracket.

17. The assembly of claim 16 wherein:
    the liner cap is a plastic liner cap.

18. The assembly of claim 16 wherein:
    the liner cap with an elastic manual override element is pressed into a recess of the sliding element for holding the liner cap on the sliding element.

19. The assembly of claim 14 wherein:
    a vernier is on the eccentric disk and the first supporting arm, wherein the vernier is formed by a scale on the eccentric disk and a positioning bar on the first supporting arm.

20. The assembly of claim 1 further comprising:
    a collapsible roof movable into and out of the folding top bin of the vehicle while the folding top bin cover is moved out of the covered position.

* * * * *